US006380957B1

(12) United States Patent
Banning (10) Patent No.: US 6,380,957 B1
(45) Date of Patent: Apr. 30, 2002

(54) METHOD OF CONTROLLING VIEW OF LARGE EXPANSION TREE

(75) Inventor: Kenneth Ray Banning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,352

(22) Filed: Dec. 15, 1998

(51) Int. Cl.[7] .................................................. G06F 3/14
(52) U.S. Cl. ...................... 345/828; 345/853; 345/855; 345/841; 345/825; 345/829
(58) Field of Search ................................. 345/352, 353, 345/356, 357, 326, 339

(56) References Cited

U.S. PATENT DOCUMENTS 5,588,107 A * 12/1996 Bowden ..................... 345/344
6,078,327 A *  6/2000 Liman ........................ 345/357
6,104,400 A *  8/2000 Halachmi ................... 345/356
6,128,016 A * 10/2000 Coelho ....................... 345/347

OTHER PUBLICATIONS

"Microsoft Windows User's Guide for the Microsoft Windows Operating System Version 3.1" (Phoenix Technologies Ltd., published 1992) pertinent pp. 53–65.*

* cited by examiner

Primary Examiner—Raymond J. Bayerl
Assistant Examiner—Thomas T. Nguyen
(74) Attorney, Agent, or Firm—Volel Emile; Bracewell & Patterson, L.L.P.

(57) ABSTRACT

A method of viewing a directory tree containing logical file system objects residing on a computer system, by displaying a directory tree on a display device of the computer system utilizing a graphical user interface (GUI), expanding a first node of the tree to reveal one or more branches of the first node, and then later expanding a second node of the tree to reveal one or more branches of the second node, wherein the invention automatically collapses the first node of the tree to conceal the one or more branches of the first node in response to the expanding of the second node. This automatic collapsing of other nodes that are not in the path of the selected node thus limits overall expansion of the tree. The setting may be toggled between enabled and disabled states. A pull-down menu can be provided by the GUI which contains the "limit expansion" command.

18 Claims, 9 Drawing Sheets

METHOD OF CONTROLLING VIEW OF LARGE EXPANSION TREE

BACKGROUND OF THE INVENTION

1. Field of the Invention

The present invention generally relates to computer systems, specifically, to a method of displaying information associated with computer file systems, such as devices, directories, files, and symbolic links, and more particularly to such a method that displays a tree structure having expandable/collapsible nodes.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct memory-access channels. A computer system may have many additional components, such as serial and parallel ports and expansion slots for connection to, e.g., printers and network adapters. Other components might further be used in conjunction with the foregoing; for example, a display adapter might be used to control a video display monitor, a memory controller can be used to access the system memory, etc.

To an end user, most computer systems have the same general structure for storing and accessing data, that is, by placing the data in "files" whose names have a particular format, and placing the files in "folders" or "directories" to further organize them. These files and directories are physically encoded into the machine's storage device, e.g., hard disk, along with other logical file system objects, such as symbolic links ("shortcuts" or "aliases" for other devices, directories or files). Computer operating systems such as UNIX, OS/2 or MS-DOS use this type of a filing system ("UNIX" is a trademark of UNIX System Laboratories; OS/2 is a trademark of International Business Machines Corp.; MS-DOS is a trademark of Microsoft Corp.). In these systems, each file has a unique path name which identifies its location within the file structure.

Most computers have a "root" directory from which all other directories or sub-directories branch out, so it is convenient to display the file system as a tree structure. A directory tree allows a user to organize software applications or data which have related subject matter or a common theme. Additionally, software applications can organize directory tree members into a hierarchical configuration. A directory tree is typically displayed within a graphical user interface (GUI) of the computer system. A GUI allows a user to select files and otherwise manipulate the display and execute commands utilizing a graphical pointing device, commonly referred to as a mouse.

Figure 1A:
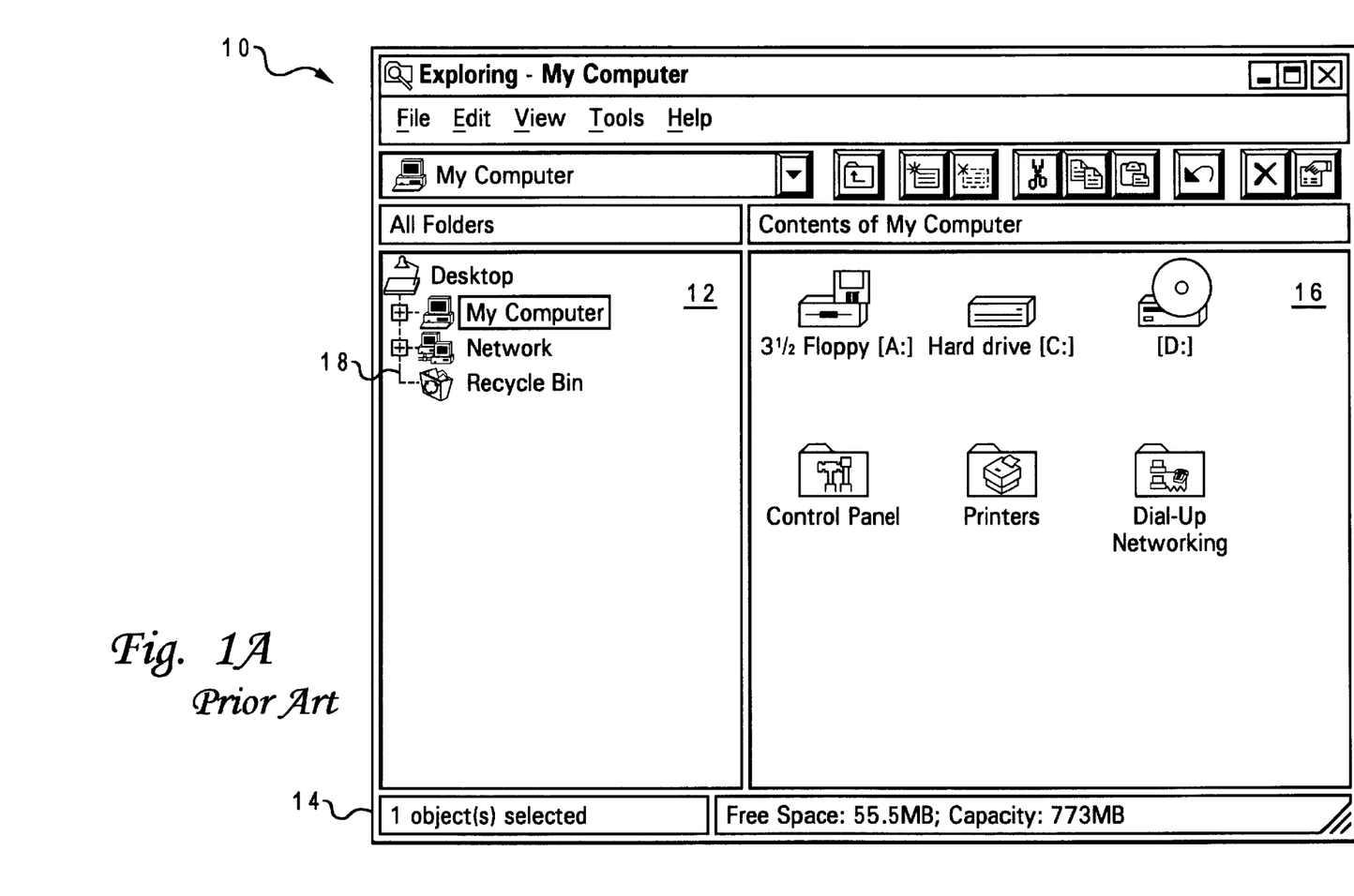
FIGS. 1A–1D are pictorial representations of a conventional graphical user interface (GUI) providing various displays of a directory tree structure used to view logical file system objects that reside on a computer system.

As shown in FIG. 1A, a typical GUI may display a directory tree 10 within a pane 12 of a larger window area 14. In this example, pane 12 is on the left side of window 14, while the right side contains another pane 16 which is used to display logical file system objects that reside in a particular device or directory that has been selected in pane 12. The root directory for this file system is the "Desktop" which includes three items: "My Computer"; "Network"; and "Recycle Bin". In FIGS. 1A–1D, right pane 16 displays the same objects since "My Computer" is selected in left pane 12 for each of those figures. User selection of one of these objects can be accomplished by "pointing and clicking" the object using the mouse.

The items which reside in the root directory are connected or linked in the GUI using a vertical (dotted) line which can be referred to as a linking indicator. In FIG. 1A, only an outer linking indicator 18 is shown. Furthermore, the "My Computer" and "Network" objects are visually anchored to outer linking indicator 18 using small boxes or nodes which contain a plus sign (+). These nodes (expansion controls) indicate that there are other directories or folders present within the respective items, and selection of the nodes (by pointing and clicking) can be used to further expand or collapse the directory structures, as shown in FIGS. 1B–1D.

Figure 1B:
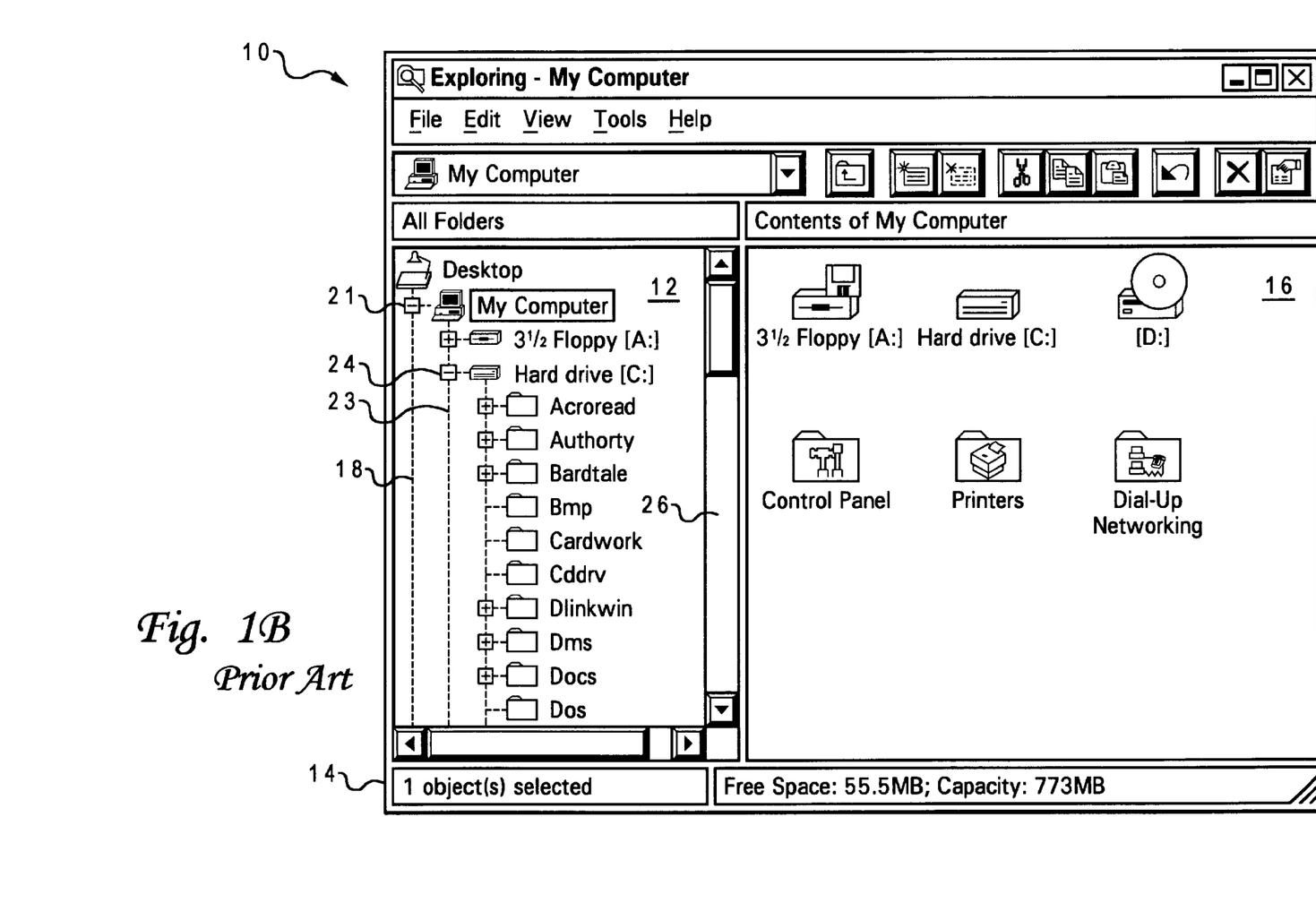
Figure 1C:
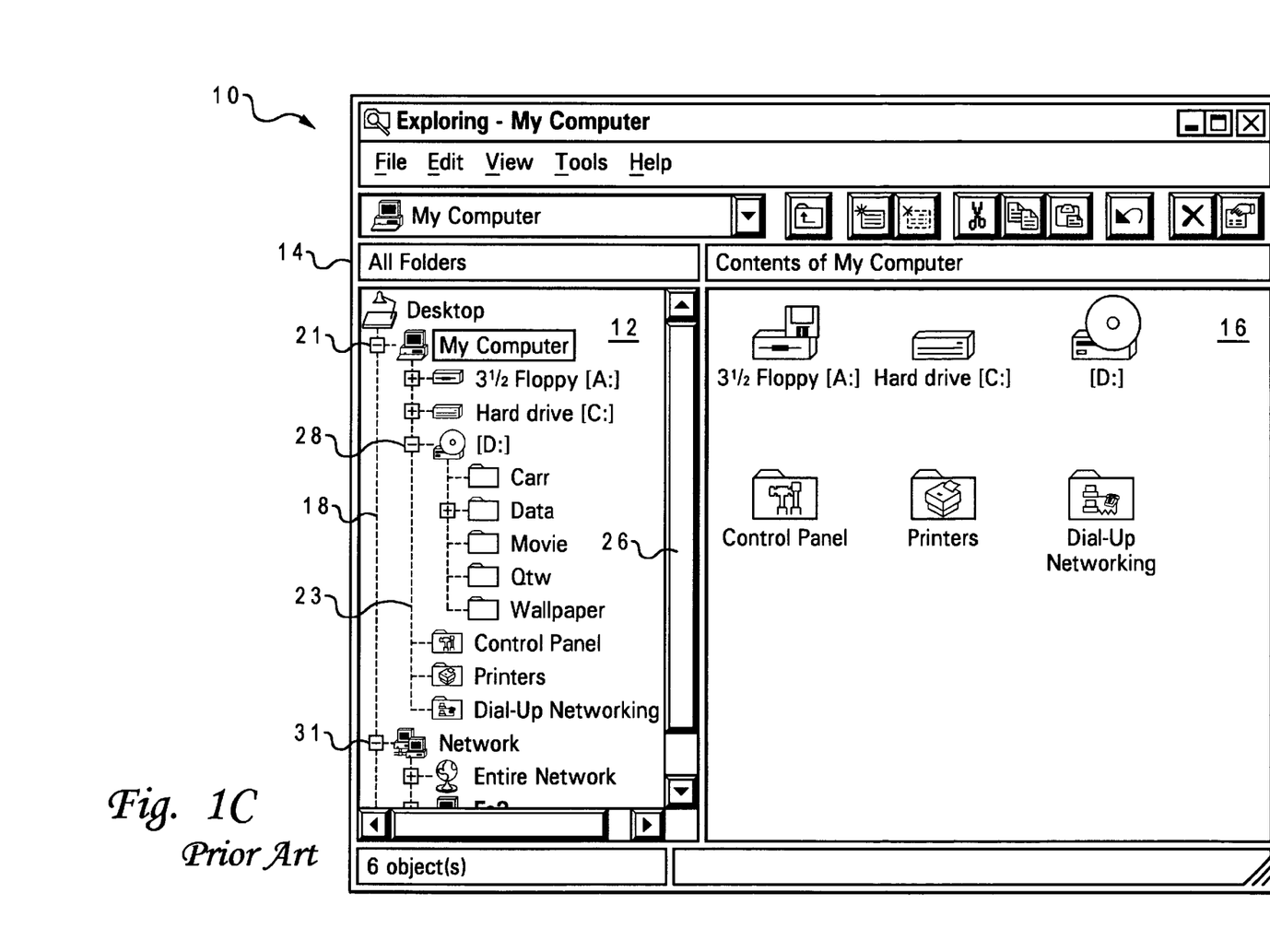
Figure 1D:
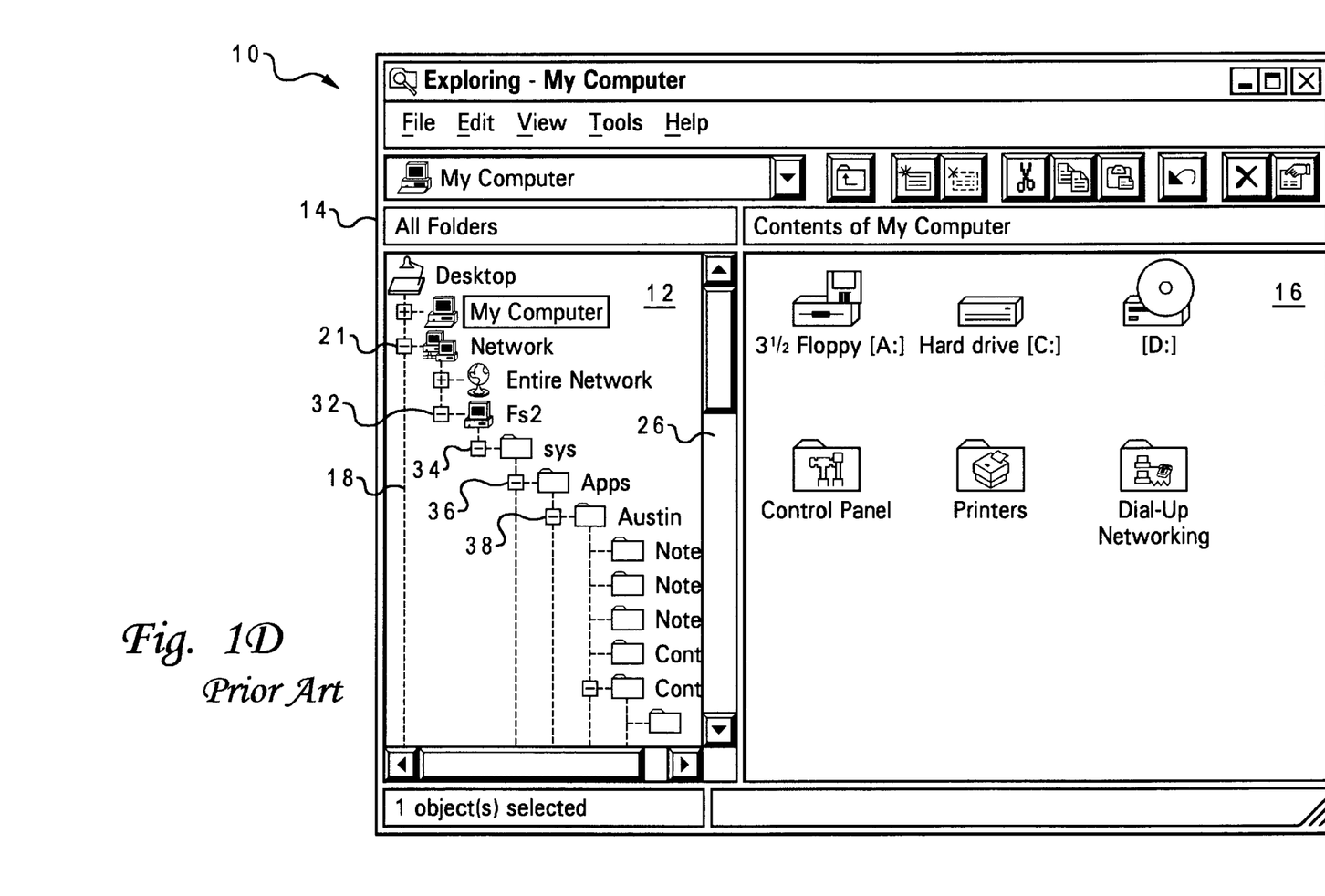

As seen in FIG. 1B, when the expansion control 21 adjacent "My Computer" is selected, the "+" indicator symbol changes to a minus sign (−), and the various items within that object are displayed as part of the directory tree in pane 12. In other words, the presence of a particular indicator symbol "+" or "−" provides an indication of whether the object is in a collapsed state or in an expanded state. When neither symbol appears to the left of a directory/device, no directories (or subdirectories) exist as a subset of that object (e.g., the "Recycle Bin"). FIG. 1B also uses an inner linking indicator 23 (another vertical dotted line) to connect the various objects that reside within the expanded "My Computer," i.e., at the next level in the hierarchy.

Oftentimes, expansion of a directory tree using the nodes results in a displayed tree structure which is larger than the size of the available pane. In such cases, the full directory can be scanned using scroll bars that move (pan) the available display area along the tree structure. This oversizing of the directory tree can generally arise from one of three causes. First, a selected object (branch) may have to many sibling branches (the breadth of the tree). Second, the user may have expanded multiple sibling branches (scope of use). Third, there may be too many levels of branches open (depth of the tree). These three causes are illustrated in FIGS. 1B–1D, respectively. Of course, a combination of these causes can also lead to a directory tree that is too large to fit within the confines of the pane.

In FIG. 1B, expansion control 24 has been selected in addition to control 21, resulting in an expansion that reveals various folders residing on "Hard drive (C:)". The number of these folders ("Acroread," "Authorty," etc.) is so high that they cannot all be shown within pane 12. Accordingly, a vertical scroll bar 26 is generated by the GUI in a conventional fashion to allow vertical scrolling of the entire tree structure.

In FIG. 1C, expansion controls 28 and 30 have been selected in addition to control 21, resulting in an expansion that reveals various folders residing on the CD-ROM device "(D:)", and on the "Network". Again, the total number of these folders is so high that they cannot all be shown within pane 12, and vertical scroll bar 26 is generated.

In FIG. 1D, expansion controls 32, 34, 36 and 38 have been selected in addition to control 21, resulting in an expansion that reveals various folders residing within a five-level deep folder entitled "Austin." The number of levels reached, combined with the number of folders at the fifth level, result in a tree expansion that is again too large to fit within the available display area.

There are several methods of adjusting the display (GUI) to allow viewing of more of a directory tree that has been partially obscured due to excessive expansion. First, the size of pane 12 may be changed in some GUIs, by selecting the pane boundary within window 14 and "dragging" it to the right, without adjusting the overall size of window 14. Second, the boundaries of window 14 can be alternatively (or additionally) resized with a corresponding increase in the size of pane 12 resulting. Finally, a user can collapse previously expanded nodes of the tree so as to hide or obscure lower level branches of those nodes, but this procedure must be performed manually, and can be very tedious and time-consuming. It would, therefore, be desirable to devise a method of simplifying the display of a directory tree to avoid oversizing the tree as a result of node expansion. It would be further advantageous if the method could retain the current behavior and user interaction for GUIs, and extend the functionality without unduly increasing the visual complexity.

SUMMARY OF THE INVENTION

It is therefore one object of the present invention to provide a computer system having an improved method of displaying logical file system objects residing on the computer system, such as hardware devices, directories, subdirectories, files and symbolic links.

It is another object of the present invention to provide such a method that uses a directory tree to visually present the information.

It is yet another object of the present invention to provide a method of simplifying the viewing of a directory tree to avoid oversizing of the tree when a node thereof is expanded to reveal a large number of branches.

The foregoing objects are achieved in a method of viewing a directory tree containing logical file system objects residing on a computer system, generally comprising the steps of displaying a directory tree on a display device of the computer system utilizing a graphical user interface, expanding a first node of the tree to reveal one or more branches of the first node, expanding a second node of the tree to reveal one or more branches of the second node, and automatically collapsing the first node of the tree to conceal the one or more branches of the first node in response to said expanding of the second node, thus limiting overall expansion of the tree. The user can toggle the setting so as to selectively enable or disable the limitation of expansion of nodes. A pull-down menu can be provided which contains the "limit expansion" command, and this command can be selected from the pull-down menu using a graphical pointing device (mouse), or accessed via a keyboard command.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 2:
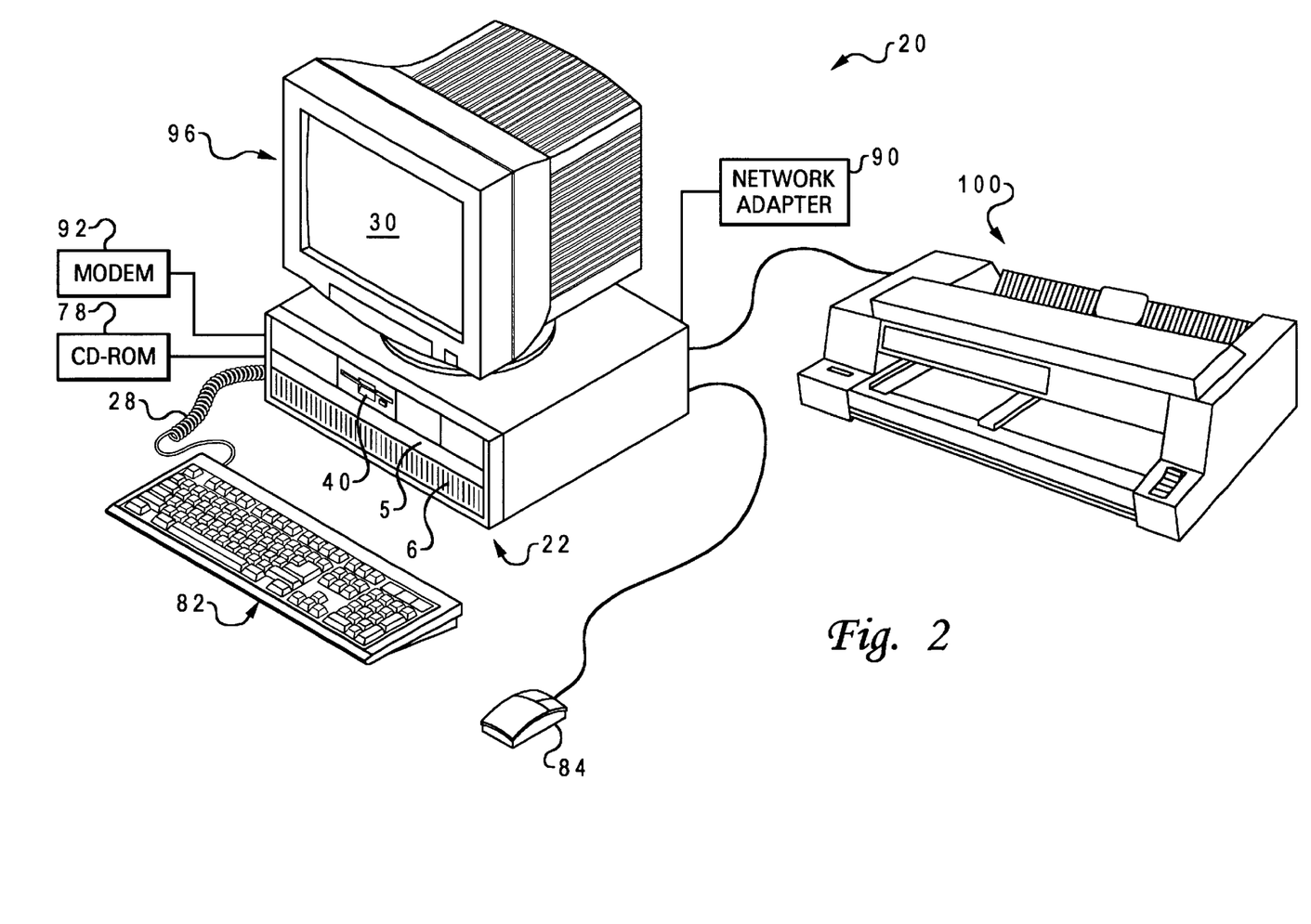
FIG. 2 is a perspective view of one embodiment of a data processing system in which the present invention can be practiced.

With reference now to the figures, and in particular with reference to FIG. 2, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy a disk drive 40, each of which may be internal or external to a the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 3:
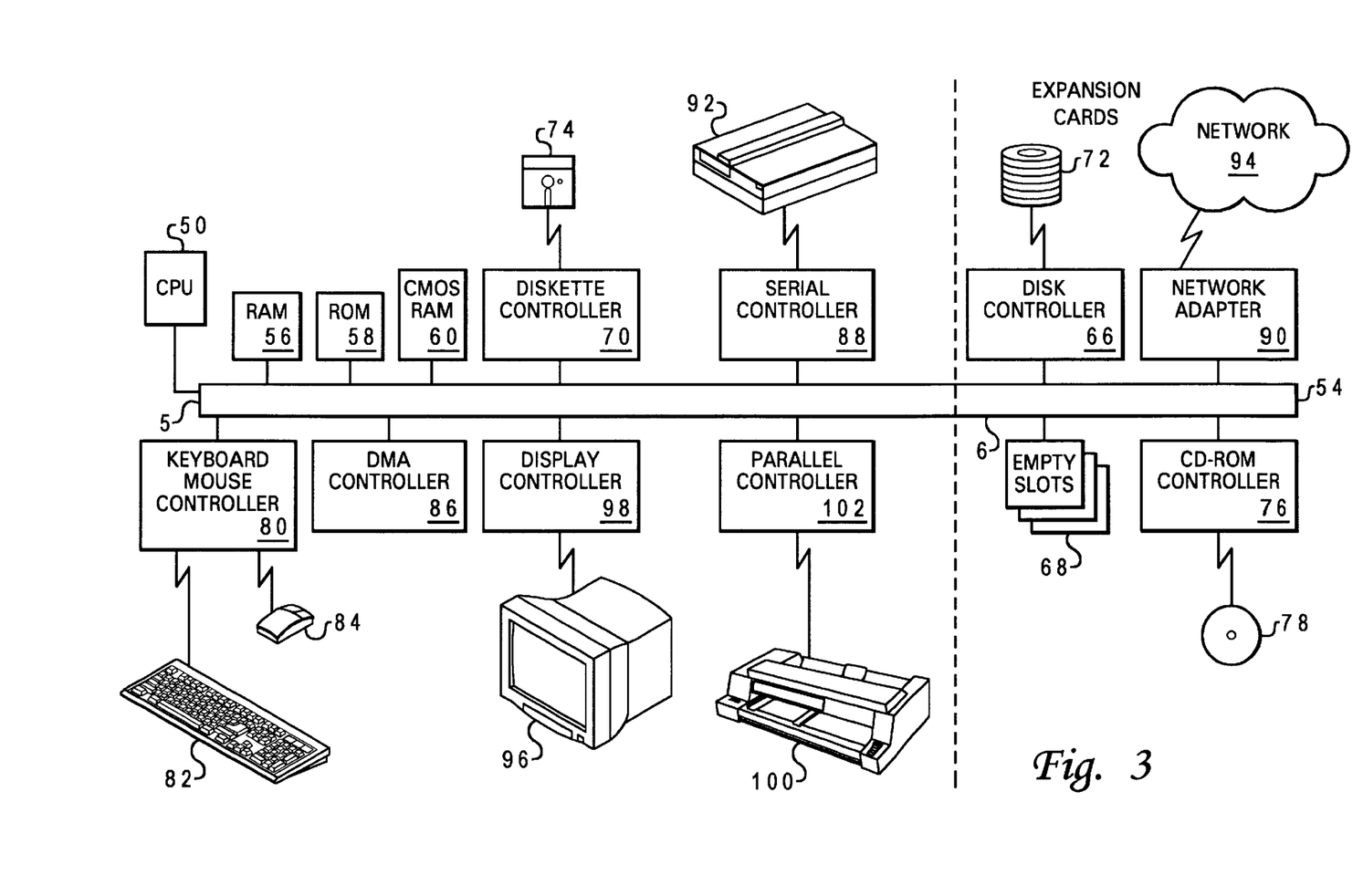
FIG. 3 is a high-level block diagram illustrating selected components that can be included in the data processing system of FIG. 2 according to the teachings of the present invention.

Referring to FIG. 3, a high level block diagram is shown illustrating selected components that can be included in the data processing system 20 of FIG. 2 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 55 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 3, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM—assignee of the present invention).

Communication between processing system 20 and other data processing systems may be facilitated by serial controller 88 and network adapter 90, both of which are coupled to system bus 55. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software and data, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with, e.g., a CRT-based video display, an LCD-based flat-panel display, or a gas plasma-based flat-panel display.

Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 55 and another parallel communication device, such as a printer 100.

CPU 50 fetches, decodes, and executes instructions, and transfers information to and from other resources via the computers main data-transfer path, system bus 55. Such a bus connects the components in a data processing system 20 and defines the medium for data exchange. System bus 55 connects together and allows for the exchange of data between memory units 56, 58, and 60, CPU 50, and other devices as shown in FIG. 3. Those skilled in the art will appreciate that a data processing system constructed in accordance with the present invention may have multiple components selected from the foregoing, including even multiple processors.

Figure 4A:
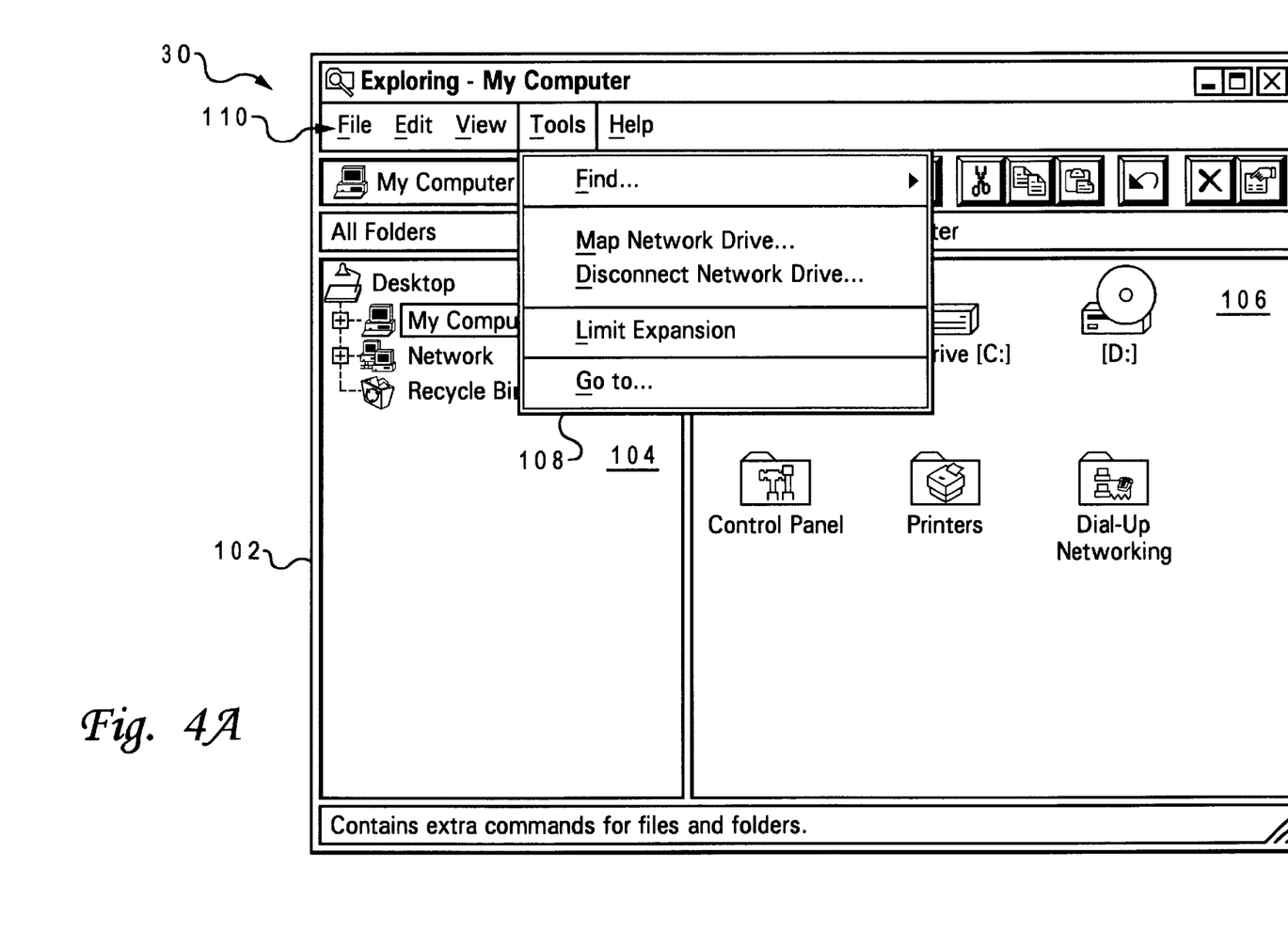
FIGS. 4A–4C are pictorial representations of a GUI designed in accordance with the present invention, showing how the expansion of branches of a directory tree structure may be limited to simplify viewing of the tree.
Figure 4B:
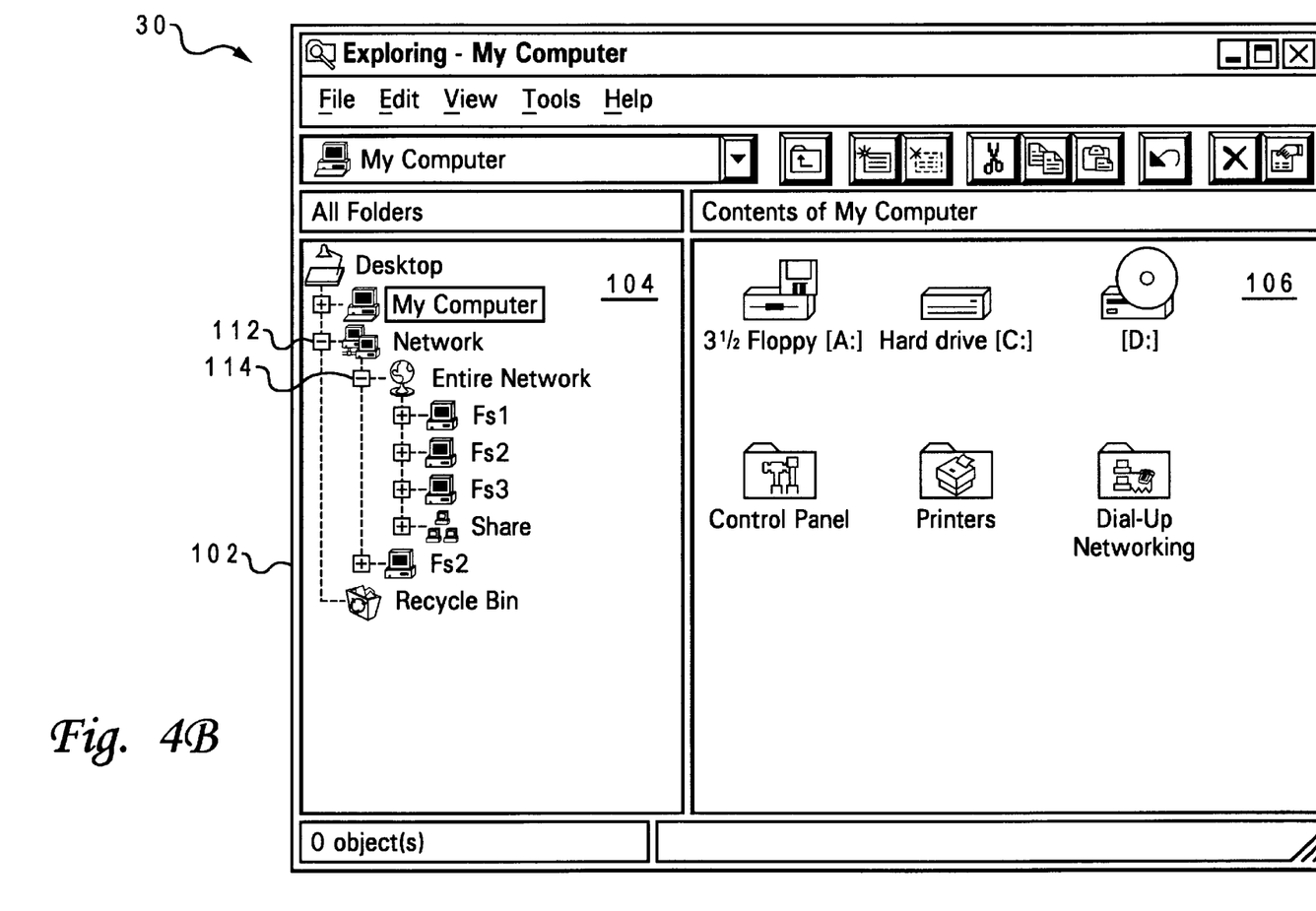

With further reference to FIGS. 4A–4B, one implementation of the present invention allows data processing system 20 to generate a graphical user interface (GUI) which can be used to visually present logical file system objects of data processing system 20 in a directory tree structure. Program instructions stored on hard disk 72 are loaded into RAM 56 and used by processor 50 to generate the GUI and create a window 102 on screen 30 of display 96. The details of such program instructions will become apparent to one skilled in the art upon reference to this disclosure, and are not discussed here.

Window 102 is similar to the window 14 of the prior art, and includes a left pane 104 for viewing the directory tree, and a right pane 106 for viewing logical file system objects that reside in a particular device or directory that has been selected in pane 104. The root directory is again depicted as "Desktop" and again has the three items "My Computer," "Network," and "Recycle Bin". The GUI generating window 102 is, however, different from prior art GUIs in that, in the present invention, the GUI provides a method of allowing a user to limit expansion of the nodes or branches of the directory tree displayed in pane 104.

Specifically, in the illustrative embodiment, a new command is provided called "Limit Expansion" which, if enabled, causes all currently expanded nodes (revealed branches) of the tree to collapse (and hide those branches) whenever a sibling node is selected for expansion. In other words, when a user expands a given branch on a certain path, all other branches not on that path are collapsed. If a choice on the path already has a sibling branch collapsed (a partial collapse), the expansion control symbol can change to an equal sign (=). This approach eliminates the depth and breadth problems, and also eliminates the problem of multiple expansions (scope of use) since only one path is allowed to have expanded nodes.

As seen in FIG. 4A, this new command may be implemented using a pull-down menu 108 that appears by selecting the "Tools" item in a menu bar 110. This selection may be performed using a graphical pointing device (mouse), or using keyboard commands (or a touch-screen if one is provided). The "Limit Expansion" mode can be thus toggled between enabled and disabled states. In the disabled state, the GUI provides conventional viewing of the directory tree with regarding to expansion and collapsing of the nodes.

Figure 4C:
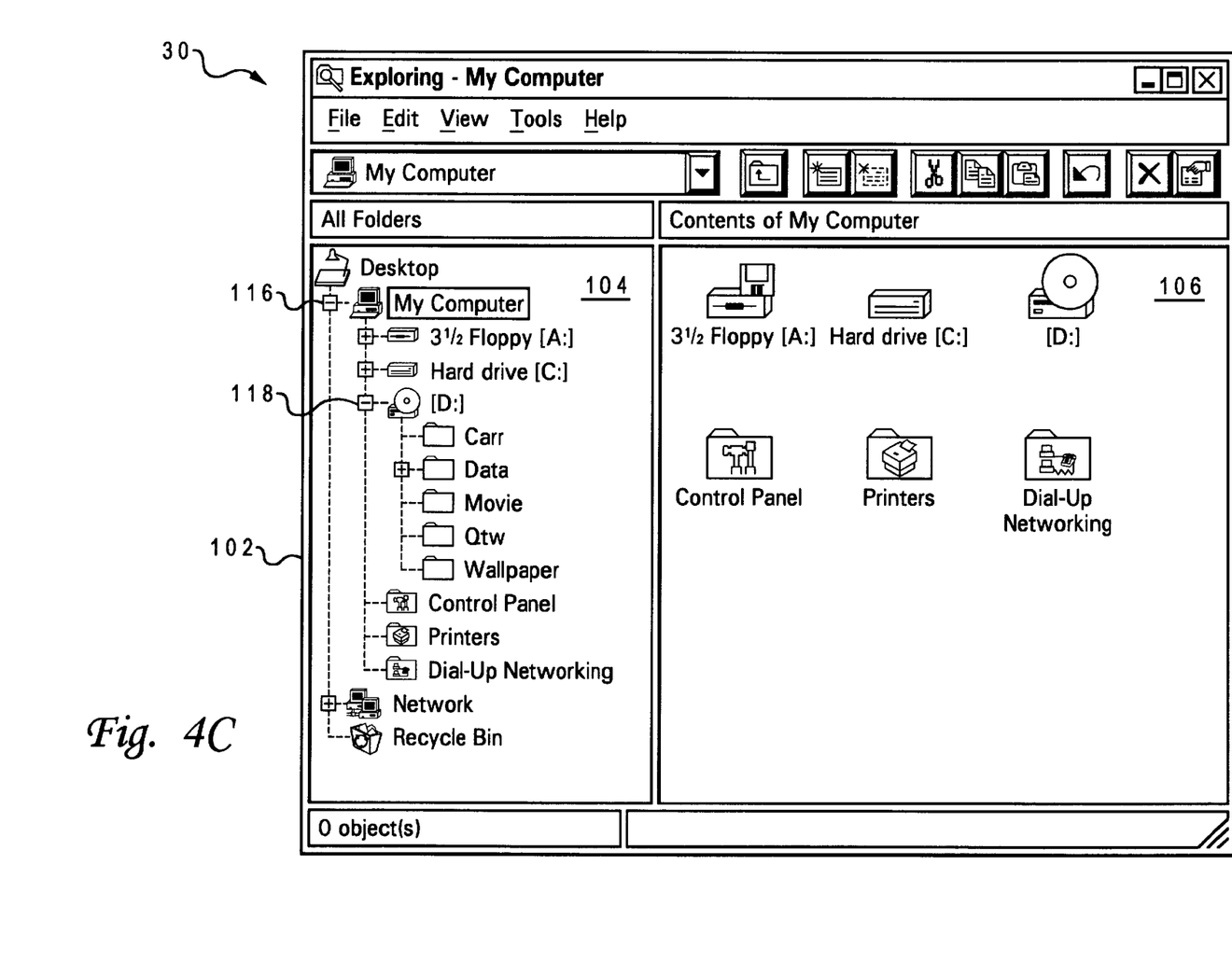

FIGS. 4B and 4C depict how the present invention simplifies the viewing of the directory tree. In FIG. 4B, a primary node 112 has been expanded to reveal two objects ("Entire Network" and "Fs2"), and a secondary node 114 has further been expanded to reveal objects residing in the "Entire Network" object. In FIG. 4C, the user has selected another primary node 116 for expansion, and further has expanded a secondary node 118. When primary node 116 is expanded, primary nodes 112 and 114 automatically collapse (because the "Limit Expansion" mode has been enabled).

The invention may include additional features or options other than the basic ability to toggle between the limited and unlimited expansion states. For example, the user might be allowed to set a certain depth up to which expansion would be allowed, but beyond which off-path nodes would be collapsed. This option could be used to keep primary node 112 expanded but collapse secondary node 114 in FIG. 4B when primary node 116 is selected for expansion (assuming that the option is set to maintain expansions of only the first, or primary, level). Another option is to allow the user to set only a certain number of siblings that can be expanded. A further feature is to automatically expand nodes that have previously been collapsed when a later expanded node is collapsed.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of viewing a directory tree containing logical file system objects residing on a computer system, comprising the steps of:

displaying a directory tree on a display device of the computer system utilizing a graphical user interface;

enabling limitation of expansion of nodes;

expanding a first node of the tree to reveal one or more branches of the first node;

expanding a second node of the tree to reveal one or more branches of the second node; wherein the second node is located on a path in the directory tree and the first node is determined to not be on the path of the second node; and automatically collapsing the first node of the tree to conceal the one or more branches of the first node in response to said expanding of the second node, whereby only a single one of said first and said second node is displayed at a given time.

2. The method of claim 1 further comprising the step of setting a predetermined tree depth up to which node expansion is to be allowed.

3. The method of claim 1 further comprising the step of setting only a certain number of sibling nodes of the tree that can be expanded.

4. The method of claim 1 further comprising the steps of:

collapsing the second node of the tree to conceal the one or more branches of the second node; and automatically expanding the first node of the tree to again reveal the one or more branches of the first node in response to said collapsing of the second node.

5. The method of claim 1 further comprising the step of displaying a pull-down menu containing a limit expansion command on the display device of the computer system.

6. The method of claim 5 further comprising the step of selecting the limit expansion command from the pull-down menu using a graphical pointing device.

7. A computer system comprising:

a display device;

a storage device;

means, connected to said display device and said storage device, for processing program instructions; and program instructions, stored on said storage device, for (i) displaying a directory tree on said display device wherein the tree contains logical file system objects residing on the computer system, (ii) enabling and disabling of limitation of expansion of nodes of the tree, and (iii) automatically collapsing a first node of the tree to conceal one or more revealed branches of the first node in response to selection of a second node of the tree for expansion, wherein the second node is located on a path in the directory tree and a determination is made that the first node in not on the path of the second node, whereby only a single one of said first and said second node is displayed at a given time.

8. The computer system of claim 7 wherein said program instructions further set a predetermined tree depth up to which node expansion is to be allowed.

9. The computer system of claim 7 wherein said program instructions further set only a certain number of sibling nodes of the tree that can be expanded.

10. The computer system of claim 7 wherein said program instructions further automatically expand the first node of the tree to again reveal the one or more branches of the first node in response to collapsing of the second node.

11. The computer system of claim 7 wherein said program instructions further display a pull-down menu containing a limit expansion command on the display device of the computer system.

12. The computer system of claim 11 wherein said program instructions further allow the selection of the limit expansion command from the pull-down menu using a graphical pointing device.

13. A computer program product comprising:

a storage medium adapted to be read by a computer; and program means stored on said storage medium for (i) displaying a directory tree on a display device of the computer system wherein the tree contains logical file system objects residing on the computer system, (ii) enabling and disabling of limitation of expansion of nodes of the tree, and (iii) automatically collapsing a first node of the tree to conceal one or more revealed branches of the first node in response to selection of a second node of the tree for expansion, wherein the second node is located on a path the directory tree and a determination is made that the first node in not on the path of the second node, whereby only a single one of said first and said second node is displayed at a given time.

14. The computer program product of claim 13 wherein said program means further sets a predetermined tree depth up to which node expansion is to be allowed.

15. The computer program product of claim 13 wherein said program means further sets only a certain number of sibling nodes of the tree that can be expanded.

16. The computer program product of claim 13 wherein said program means further automatically expands the first node of the tree to again reveal the one or more branches of the first node in response to collapsing of the second node.

17. The computer program product of claim 13 wherein said program means further displays a pull-down menu containing a limit expansion command on the display device of the computer system.

18. The computer program product of claim 17 wherein said program means further allows the selection of the limit expansion command from the pull-down menu using a graphical pointing device of the computer system.

* * * * *